US012632314B2

(12) United States Patent
Zhao et al.

(10) Patent No.: US 12,632,314 B2
(45) Date of Patent: May 19, 2026

(54) ELASTIC PROVISIONING OF CONTAINER-BASED GRAPHICS PROCESSING UNIT (GPU) NODES

(71) Applicant: VMware, Inc., Palo Alto, CA (US)

(72) Inventors: Yisan Zhao, Beijing (CN); Xiaoyu Hu, Austin, TX (US); Robert Riemer, Siegburg (DE); Aidan Cully, Saint Augustine, FL (US)

(73) Assignee: VMware LLC, Palo Alto, CA (US)

( * ) Notice: Subject to any disclaimer, the term of this patent is extended or adjusted under 35 U.S.C. 154(b) by 355 days.

(21) Appl. No.: 18/142,041

(22) Filed: May 2, 2023

(65) Prior Publication Data

US 2024/0241760 A1    Jul. 18, 2024

(30) Foreign Application Priority Data

Jan. 12, 2023    (WO) ................ PCT/CN2023/000007

(51) Int. Cl.
*G06F 9/50* (2006.01)
*G06F 11/34* (2006.01)

(52) U.S. Cl.
CPC .......... *G06F 9/505* (2013.01); *G06F 11/3442* (2013.01)

(58) Field of Classification Search
CPC .... G06F 9/505; G06F 11/3442; G06F 9/5077; G06F 2209/5011
See application file for complete search history.

(56) References Cited

U.S. PATENT DOCUMENTS

| | | | | |
|---|---|---|---|---|
| 8,260,840 | B1 * | 9/2012 | Sirota ................... | G06F 9/5061 |
| | | | | 725/94 |
| 8,719,415 | B1 * | 5/2014 | Sirota ................... | G06F 9/5061 |
| | | | | 709/221 |
| 8,966,030 | B1 * | 2/2015 | Sirota ..................... | H04L 67/10 |
| | | | | 709/221 |
| 10,262,390 | B1 * | 4/2019 | Sun ........................ | G06F 9/5077 |
| 10,275,851 | B1 * | 4/2019 | Zhao ...................... | G09G 5/363 |
| 10,325,343 | B1 * | 6/2019 | Zhao ................... | H04L 67/1042 |
| 12,154,025 | B1 * | 11/2024 | Savic .................... | G06F 3/0659 |
| 2015/0089034 | A1 * | 3/2015 | Stickle ..................... | H04L 41/28 |
| | | | | 709/223 |
| 2015/0135185 | A1 * | 5/2015 | Sirota ..................... | H04L 67/10 |
| | | | | 718/103 |
| 2016/0277488 | A1 * | 9/2016 | Fallon ................. | H04L 67/1031 |
| 2018/0131581 | A1 * | 5/2018 | DeLuca .............. | H04L 41/5019 |

(Continued)

*Primary Examiner* — Benjamin C Wu
(74) *Attorney, Agent, or Firm* — Kim & Stewart LLP

(57) ABSTRACT

Example methods and systems for elastic provisioning of container-based graphics processing unit (GPU) nodes are described. In one example, a computer system may monitor usage information associated with a pool of multiple container-based GPU nodes. Based on the usage information, the computer system may apply rule(s) to determine whether capacity adjustment is required. In response to determination that capacity expansion is required, the computer system may configure the pool to expand by adding (a) at least one container-based GPU node to the pool, or (b) at least one container pod to one of the multiple container-based GPU nodes. Otherwise, in response to determination that capacity shrinkage is required, the computer system may configure the pool to shrink by removing (a) at least one container-based GPU node, or (b) at least one container pod from the pool.

15 Claims, 6 Drawing Sheets

(56)     References Cited

U.S. PATENT DOCUMENTS

| | | | |
|---|---|---|---|
| 2021/0081265 A1* | 3/2021 | Mariyappa | G06F 9/5072 |
| 2021/0117249 A1* | 4/2021 | Doshi | G06F 9/5077 |
| 2021/0149745 A1* | 5/2021 | An | G06F 9/5083 |
| 2021/0263780 A1* | 8/2021 | Ou | G06F 9/5077 |
| 2022/0094743 A1* | 3/2022 | Asveren | H04L 67/1008 |
| 2022/0318060 A1* | 10/2022 | Choochotkaew | G06N 5/02 |
| 2022/0329651 A1* | 10/2022 | Kim | H04L 67/1008 |
| 2022/0405134 A1* | 12/2022 | Guo | G06N 3/044 |
| 2023/0050796 A1* | 2/2023 | Ghergu | G06F 9/505 |
| 2023/0080046 A1* | 3/2023 | Paul | G06F 16/128 |
| | | | 707/822 |
| 2023/0089925 A1* | 3/2023 | Cho | G06F 9/4881 |
| | | | 718/102 |
| 2023/0114504 A1* | 4/2023 | He | G06F 9/5083 |
| | | | 718/105 |
| 2023/0153162 A1* | 5/2023 | Baillargeon | G06F 9/5044 |
| | | | 718/104 |
| 2023/0289206 A1* | 9/2023 | Kim | G06F 9/5083 |
| 2023/0403198 A1* | 12/2023 | Cai | H04L 67/1031 |
| 2023/0409368 A1* | 12/2023 | Siddiqui | G06F 1/08 |
| 2024/0069964 A1* | 2/2024 | Chatterjee | G06F 9/4881 |
| 2024/0103926 A1* | 3/2024 | Saxena | H04L 67/56 |
| 2024/0176662 A1* | 5/2024 | Liu | G06F 9/5027 |
| 2024/0241760 A1* | 7/2024 | Zhao | G06F 9/5077 |
| 2025/0156213 A1* | 5/2025 | Ai | G06F 9/505 |

* cited by examiner

200

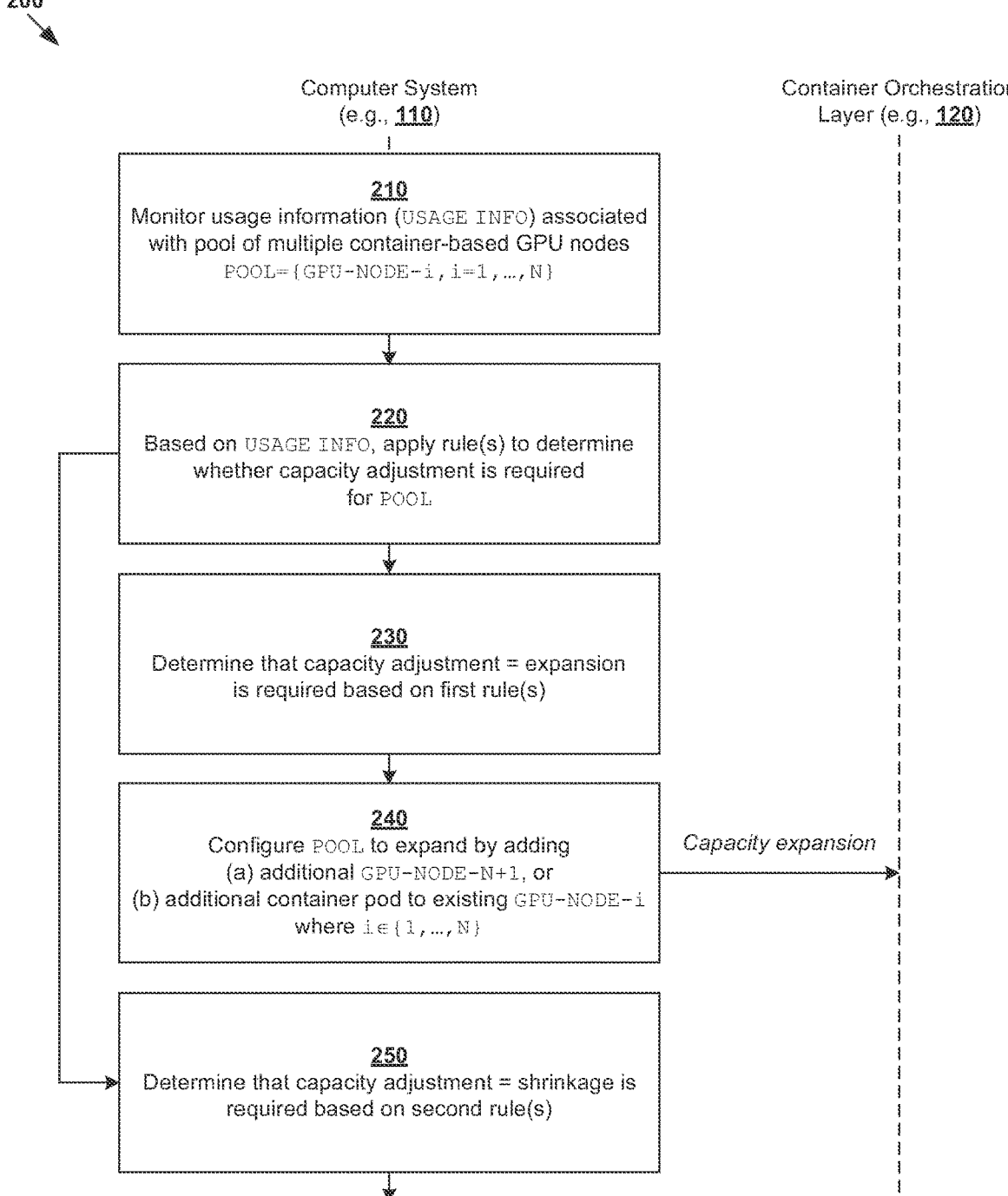

Computer System
(e.g., 110)

Container Orchestration
Layer (e.g., 120)

210
Monitor usage information (USAGE INFO) associated
with pool of multiple container-based GPU nodes
POOL={GPU-NODE-i,i=1,…,N}

220
Based on USAGE INFO, apply rule(s) to determine
whether capacity adjustment is required
for POOL

230
Determine that capacity adjustment = expansion
is required based on first rule(s)

240
Configure POOL to expand by adding
(a) additional GPU-NODE-N+1, or
(b) additional container pod to existing GPU-NODE-i
where i ∈ {1,…,N}

*Capacity expansion*

250
Determine that capacity adjustment = shrinkage is
required based on second rule(s)

260
Configure POOL to shrink by removing
(a) GPU-NODE-i or
(b) container pod from GPU-NODE-i
where i ∈ {1,…,N}

*Capacity shrinkage*

600

Management Plane
(SDN Manager)
672

Central Control Plane
(SDN Controller)
670

Control-plane
channel
601

602

Host-A 610A

VM1 631
POD1
641
Guest OS
651

VM2 632
POD2
642
Guest OS
652

Hypervisor-A 614A
VNIC1
661
VNIC2
662
LSP1
665
LSP2
666
Virtual Switch 615A
Forwarding Table
616A
DR Instance
617A
VTEP-A
619A

Hardware 612A
Processor
620A
Memory
622A
NIC(s)
624A
Storage
626A

Host-B 610B

VM3 633
POD3
643
POD4
644
Guest OS
653

Hypervisor-B 614B
VNIC3
663
VNIC4
664
LSP3
667
LSP4
668
Virtual Switch 615B
Forwarding Table
616B
DR Instance
617B
VTEP-B
619B

Hardware 612B
Processor
620B
Memory
622B
NIC(s)
624B
Storage
626B

Physical Network 605

Fig. 6

ELASTIC PROVISIONING OF CONTAINER-BASED GRAPHICS PROCESSING UNIT (GPU) NODES

CROSS-REFERENCE TO RELATED APPLICATION

The present application claims the benefit of Patent Cooperation Treaty (PCT) Application No. PCT/CN2023/000007, filed Jan. 12, 2023, which is incorporated herein by reference.

BACKGROUND

Graphics Processing Unit (GPU) acceleration refers generally to the practice of using GPU(s) to speed up computationally intensive tasks, especially for complex and data-intensive applications such as artificial intelligence (AI) and machine learning (ML) applications. Through GPU acceleration, the speed of execution may be boosted by breaking down complex computational problems into similar, parallel operations. Compared to central processing unit (CPU), GPU generally has more powerful cores that are capable of performing parallel calculations and data processing at high volume. Conventionally, GPU hardware is generally installed in an on-premise data center to support the execution of AI and/or ML workloads within the data center. However, as demand for GPU acceleration increases, it is challenging to keep upgrading GPU hardware to meet demand.

BRIEF DESCRIPTION OF DRAWINGS

FIG. 2 is a flowchart of an example process for a computer system to perform elastic provisioning of container-based GPU nodes;

FIG. 6 is a schematic diagram illustrating an example physical implementation view of container pods in an SDN environment.

DETAILED DESCRIPTION

Figure 1:
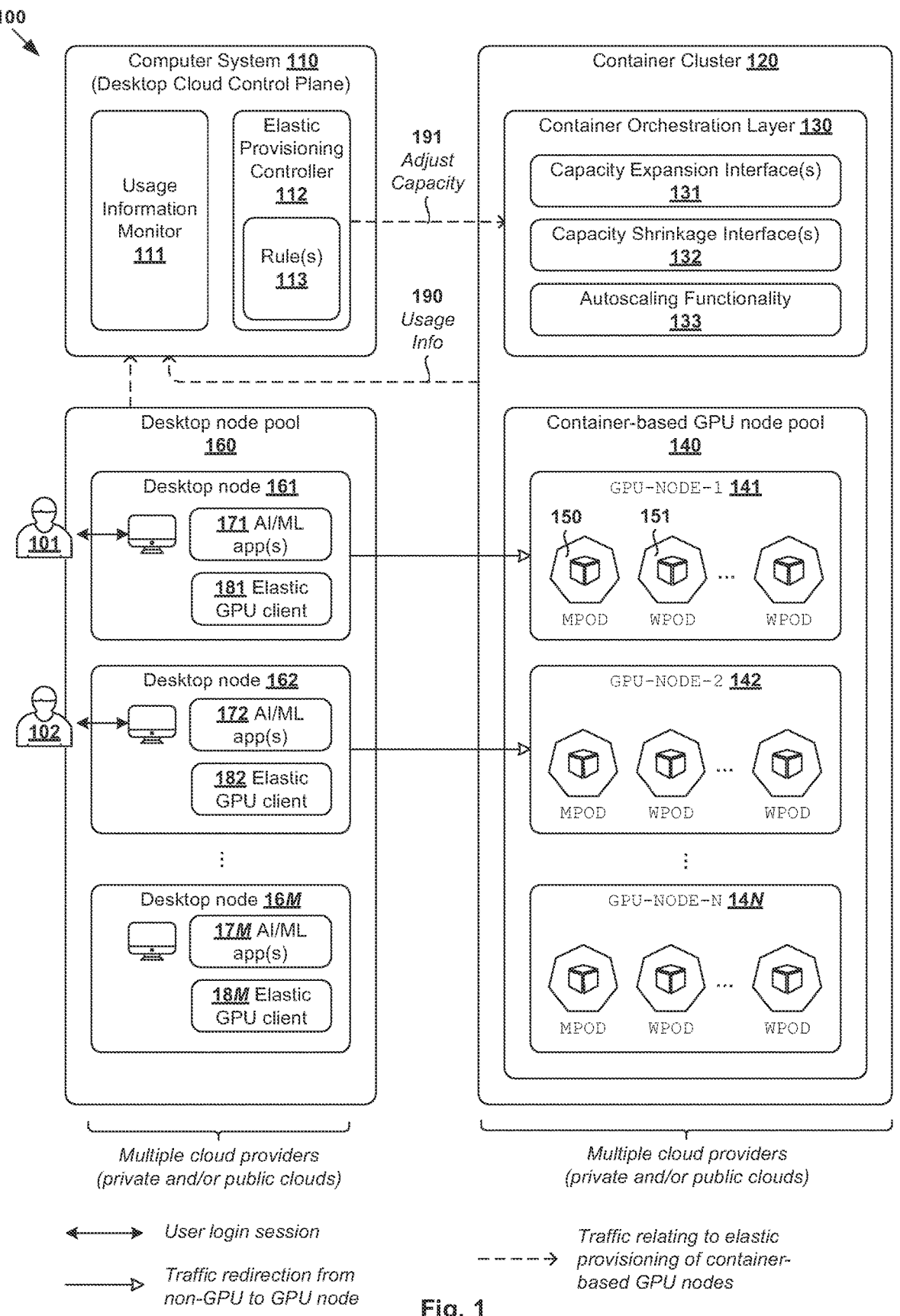
FIG. 1 is a schematic diagram illustrating an example software-defined networking (SDN) environment in which elastic provisioning of container-based graphics processing unit (GPU) nodes may be performed.

According to examples of the present disclosure, elastic provisioning may be implemented to facilitate dynamic capacity adjustment of a pool of container-based graphics processing unit (GPU) nodes. One example may involve a computer system (e.g., control plane entity 110 in FIG. 1) monitoring usage information associated with a pool of multiple container-based GPU nodes (e.g., 141-14N in FIG. 1). Each of the multiple container-based GPU nodes includes container pod(s) capable of accessing GPU resources to perform computational tasks initiated by a non-GPU node (e.g., one of desktop nodes 161-16M in FIG. 1). Based on the usage information, the computer system may apply rule(s) to determine whether capacity adjustment is required for the pool of multiple container-based GPU nodes.

In response to determination that capacity adjustment in the form of expansion is required, the computer system may configure the pool to expand by adding (a) an additional container-based GPU node to the pool, or (b) an additional container pod to one of the multiple container-based GPU nodes. In response to determination that capacity adjustment in the form of shrinkage is required, the computer system may configure the pool to shrink by removing (a) one of the multiple container-based GPU nodes from the pool, or (b) a particular container pod from one of the multiple container-based GPU nodes.

Examples of the present disclosure should be contrasted against conventional approaches that execute computationally intensive workloads such as AI/ML applications in an on-premise data center. This generally necessitates significant investment in GPU hardware within the on-premise data center. As the demand for these ML or AI workloads grows, so does the demand for the GPU hardware. As such, it is challenging to upgrade hardware quickly enough to meet (peak) demand within the on-premise data center. This strategy is also expensive, unsustainable, and possibly detrimental to the environment. When designed to meet peak demand, some on-premise GPU hardware may be underutilized at times. Compared to conventional on-premise solutions, examples of the present disclosure may be implemented with improved elasticity in the overall capacity of a GPU node pool. Further, examples of the present disclosure may be implemented with improved sustainability to reduce unused GPU hardware capacity in an on-premise data center, and reduce carbon footprint with environmentally friendly and sustainable cloud infrastructure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used to describe various elements, these elements should not be limited by these terms. These terms are used to distinguish one element from another. For example, a first element may be referred to as a second element, and vice versa.

FIG. 1 is a schematic diagram illustrating example software-defined networking (SDN) environment 100 in which elastic provisioning of container-based GPU nodes may be implemented. In the example in FIG. 1, SDN environment 100 may include desktop cloud control plane entity 110 ("computer system") that is capable of managing a GPU node pool (see 140) and a desktop node pool (see 160). Using a desktop as a service (DaaS) environment as an example, control plane entity 110 may be a management and/or orchestration service that is operated by a DaaS service provider. Control plane entity 110 may be implemented using one or more physical bare metal machines and/or virtual machines (VMs).

Desktop node pool 160 may include multiple (M) desktop nodes denoted as 161-16M. Each desktop node may be accessible by a remote user operating a client device (not shown for simplicity). For example, using virtual desktop infrastructure (VDI) technology, remote user 101/102 may log in to a virtual desktop supported by desktop node 161/162. In practice, desktop nodes 161-16M may be non-GPU VMs that do not have any GPU capability. To implement workloads that are substantially computationally intensive (e.g., AI and/or ML applications 171-17M), desktop nodes 161-16M may request for GPU acceleration using GPU node pool 140 that includes multiple (N) GPU nodes 141-14N. As used herein, the term "GPU node" or "GPU-capable node" may refer generally to a node that has access to, and is capable of utilizing, GPU to perform at least some computing tasks, thereby providing GPU acceleration to those computing tasks.

Depending on the desired implementation, desktop nodes 161-16M may span multiple cloud providers, including public and/or private clouds. In other words, at least one desktop node (e.g., 161) may be provided by a first cloud provider, and at least one other desktop node (e.g., 162) by a second cloud provider, etc. Similarly, GPU nodes 141-14N span multiple cloud providers. In this case, at least one GPU node (e.g., 141) may be provided by a first cloud provider, and at least one other GPU node (e.g., 142) by a second cloud provider, etc. Example cloud providers may include Azure from Microsoft Corporation, Amazon Web Services (AWS) from Amazon Technologies, Inc., Google Cloud Platform (GCP) from Google LLC, Alibaba Cloud (Ali-Cloud) from Alibaba Group, etc. Some cloud providers are known as "hyperscalers" or "hyperscale cloud providers" for building data centers for hyperscale computing, which refers to the ability of an architecture to scale appropriately as demand increases.

According to examples of the present disclosure, GPU node pool 140 may include at least some container-based nodes. Here, the term "container-based node" may refer generally to a node that is implemented using suitable container technology, such as Kubernetes®, Docker Swarm®, Cloud Foundry® Diego, Apache® Mesos™, etc. In practice, Kubernetes (abbreviated as "K8s") is a container orchestration platform that is designed to simplify the deployment and management of cloud-native applications at scale. Kubernetes may be implemented to provide a container-centric infrastructure for the deployment, scaling and operations of application containers across clusters of hosts. Since its inception, Kubernetes has become one of the most popular platforms for deploying containerized applications. GPU node pool 140 may be configured as autoscaling, or programmatically resizable using other application(s).

Container-based GPU nodes 141-14N may be configurable and manageable using container orchestration layer 130 associated with GPU-enabled container cluster 120 (e.g., GPU-enabled K8s cluster). In practice, the term "container cluster" may refer generally to a set of nodes for running containerized application(s). The term "container" or "containerized application" is used generally to describe an application that is encapsulated with all its dependencies (e.g., binaries, libraries, etc.). For example, multiple containers may be executed as isolated processes inside a VM. Each "OS-less" container does not include any OS that could weigh 10s of Gigabytes (GB). This makes containers more lightweight, portable and efficient. Each GPU node may be a worker VM on hyperscaler cloud providers that run containerized applications and other workloads.

Container-based GPU nodes 141-14N may each include one or more container pods. Here, the term "container pod" may refer generally to a group of one or more containers, with shared network and storage resources, and a specification for how to run the containers. Pods are generally the smallest deployable unit of computing that may be created and managed via container orchestration layer 130 (e.g., Kubernetes). A pod may be a master pod (e.g., "MPOD" at 150 in FIG. 1) or a worker pod (e.g., "WPOD" at 151 in FIG. 1). In practice, worker pod 151 may be a pod of one or more containers that are responsible to perform any computing tasks assigned by a master pod. Master pod 150 may be a pod of one or more containers that are responsible for managing worker pod(s) within a particular GPU node.

Elastic Provisioning of Container-Based GPU Nodes

According to examples of the present disclosure, elastic provisioning may be implemented to facilitate dynamic capacity adjustment of a pool of container-based graphics processing unit (GPU) nodes. Some examples will be described using FIG. 2, which is a flowchart of example process 200 for a computer system to perform elastic provisioning of container-based GPU nodes. Example process 200 may include one or more operations, functions, or actions illustrated by one or more blocks, such as 210 to 260. Depending on the desired implementation, various blocks may be combined into fewer blocks, divided into additional blocks, and/or eliminated.

In the following, examples of the present disclosure may be implemented using any suitable "computer system," such as desktop cloud control plane entity 110 that is capable of interacting of container orchestration layer 120 associated with container cluster 120. Desktop cloud control plane entity 110 may include any suitable hardware and/or software to implement examples of the present disclosure, such as usage information monitor 111 to perform block 210, elastic provisioning controller 112 to perform blocks 220-260, etc.

At 210 in FIG. 2, control plane entity 110 may monitor usage information associated with container-based GPU node pool 140 that includes multiple container-based GPU nodes 141-14N. Each container-based GPU node may include one or more container pods capable of accessing GPU resources to perform computational tasks initiated by a non-GPU node. For example in FIG. 1, a "non-GPU node" may be desktop node 161 from desktop node pool 160. Desktop node 161 may be implementing AI/ML application(s) 171 that require GPU acceleration to speed up substantially complex computational tasks. See also 190 in FIG. 1.

At 220 in FIG. 2, based on the usage information, control plane entity 110 may apply one or more rules to determine whether capacity adjustment is required for GPU node pool 140. Any suitable rule(s) may be configured to facilitate elastic provisioning. In one example, control plane entity 110 may apply a first rule specifying a minimum number of GPU worker pods that are available within GPU node pool 140. In another example, control plane entity 110 may apply a second rule specifying a maximum number of GPU worker pods that are available within GPU node pool 140.

At 230-240 in FIG. 2, in response to determination that capacity adjustment in the form of capacity expansion is required, control plane entity 110 may configure GPU node pool 140 to expand by adding (a) an additional container-based GPU node to GPU node pool 140, or (b) an additional container pod (e.g., worker pod) to one of multiple container-based GPU nodes 141-14N. See also 191 in FIG. 1. Some examples will be described using FIGS. 3 and 4.

At 250-260 in FIG. 2, in response to determination that capacity adjustment in the form of capacity shrinkage is required, control plane entity 110 may configure GPU node pool 140 to shrink by removing (a) one of multiple container-based GPU nodes 141-14N from GPU node pool 140, or (b) a container pod (e.g., worker pod) from one of multiple container-based GPU nodes 141-14N. Some examples will be described using FIGS. 3 and 5.

In one example, the configuration at block 240/260 may involve control plane entity 110 interacting with container orchestration layer 130 to expand/shrink GPU node pool 140 via interface(s) 131/132 supported by container orchestration layer 130, such as application programming interface (API), command line interface (CLI), etc. Alternatively or additionally, the configuration at block 240/260 may involve control plane entity 110 leveraging autoscaling functionality 133 associated with container orchestration layer 130 to expand/shrink GPU node pool 140. Some examples will be described using FIGS. 3-5 below.

In practice, examples of the present disclosure may be implemented to provide a multi-cloud approach for elastic GPU node pool 140 using consistent operations across different public clouds on the back of offerings by container orchestration layer 130 (e.g., Kubernetes) with native GPU access. Using cloud-native and container technologies, elastic GPU provisioning may be implemented with improved scalability compared to conventional approaches that rely on classic client-server model. One example is described in related patent application Ser. No. 17/676,397, which is incorporated herein by reference. Such client-server model (e.g., between VMs) has various limitations, such as scalability, non-disruptive maintenance and day two operations in multiple clouds.

Using Kubernetes as an example, elastic provisioning of container-based GPU nodes may be implemented to alleviate the above limitation(s) associated with the conventional client-server model using VMs. In relation to scalability, GPU node pool 140 within Kubernetes cluster 120 is generally easier to scale up or down compared to VMs. In practice, Kubernetes also provides various functionalities relating to deployment and stability management for applications. In relation to non-disruptive maintenance, Kubernetes provides inherited stability and availability for containers in a cloud environment, such as rolling update, service discovery and load balancing, etc. In relation to day two operations, Kubernetes may automatically place and balance containerized workloads, and scale clusters appropriately to accommodate increasing demand while keeping the system live.

Using examples of the present disclosure, user 101/102 in the form of an AI/ML application developer may log into desktop node 161/162 (e.g., non-GPU VM supported by a host) to access remote GPU resource(s) provided by a single or multiple GPU worker pods from GPU node pool 140. This way, user 101/102 may access remote GPU resource(s) when needed. At other times, user 101 may rely on non-GPU resources provided by desktop node 161/162, such as for analyzing and developing AI/ML models, etc. Further, a network administrator (e.g., tenant IT admin) may configure elastic provisioning rules (also known as spare policy) to expand or shrink GPU node pool 140 based on real-time usage information to satisfy the needs of end users. Various examples will be described below.

Example GPU Acceleration

Figure 3:
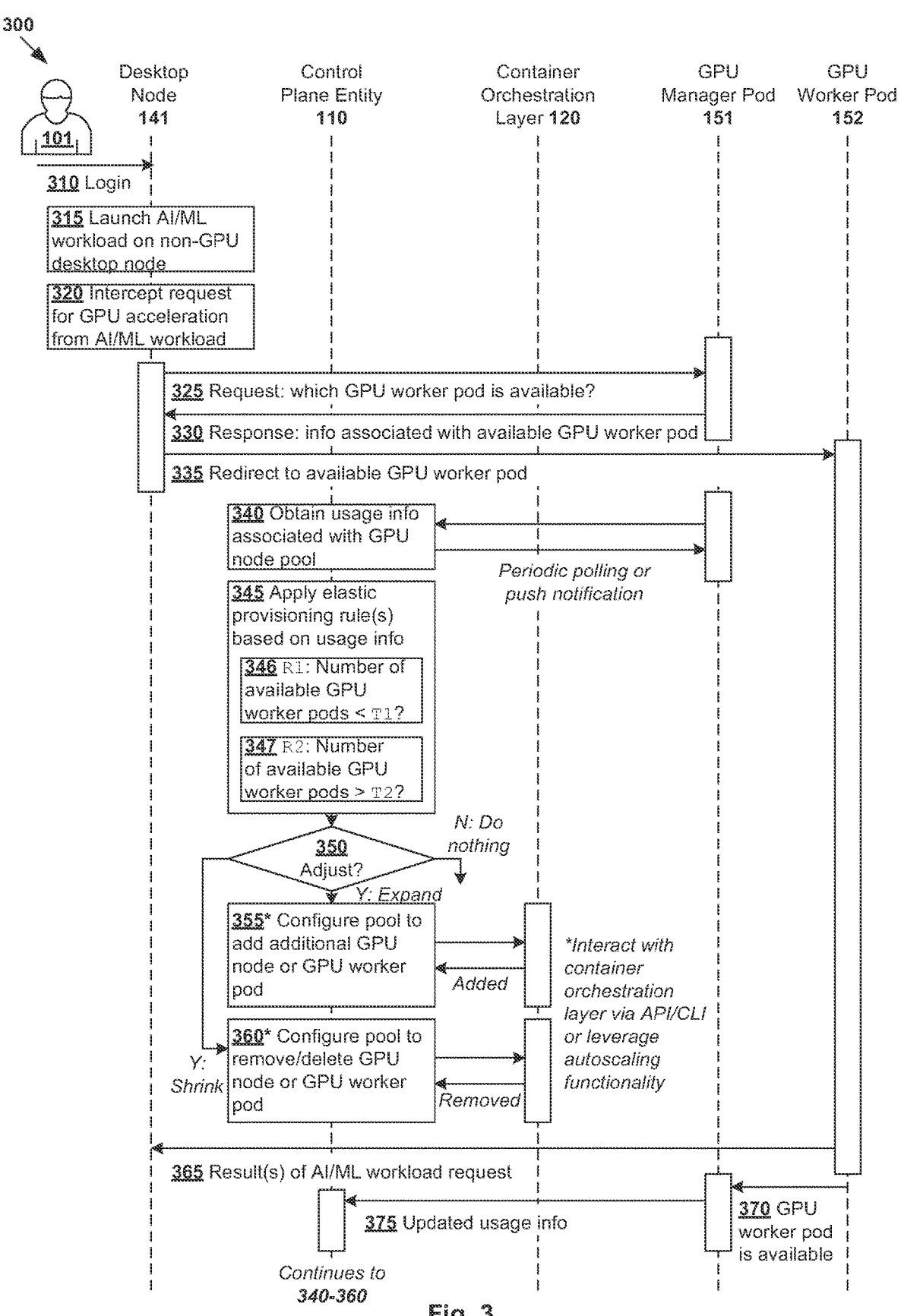
FIG. 3 is a flowchart of an example detailed process for a computer system to perform elastic provisioning of container-based GPU nodes.

FIG. 3 is a flowchart of example detailed process 300 for a first computer system to perform elastic provisioning of container-based GPU nodes in an SDN environment. Example process 300 may include one or more operations, functions, or actions illustrated by one or more blocks, such as 310 to 375. Depending on the desired implementation, various blocks may be combined into fewer blocks, divided into additional blocks, and/or eliminated. Some examples will be described using FIG. 4, which is a schematic diagram illustrating first example 400 of elastic provisioning of container-based GPU nodes with capacity expansion.

In the following, various examples will be described using (a) desktop node 161 from desktop node pool 160 and (b) container-based GPU node 141 from GPU node pool 140. In the example in FIG. 4, container-based GPU node 141 further includes that includes GPU manager node 150 and three worker nodes 151-153. It should be understood that examples of the present disclosure are applicable to other desktop nodes and GPU nodes. Also, GPU acceleration may be provided by multiple worker pods (i.e., not just GPU worker pod 151 in FIG. 4) from one or more container-based GPU nodes.

(a) Non-GPU Desktop Node

Figure 4:
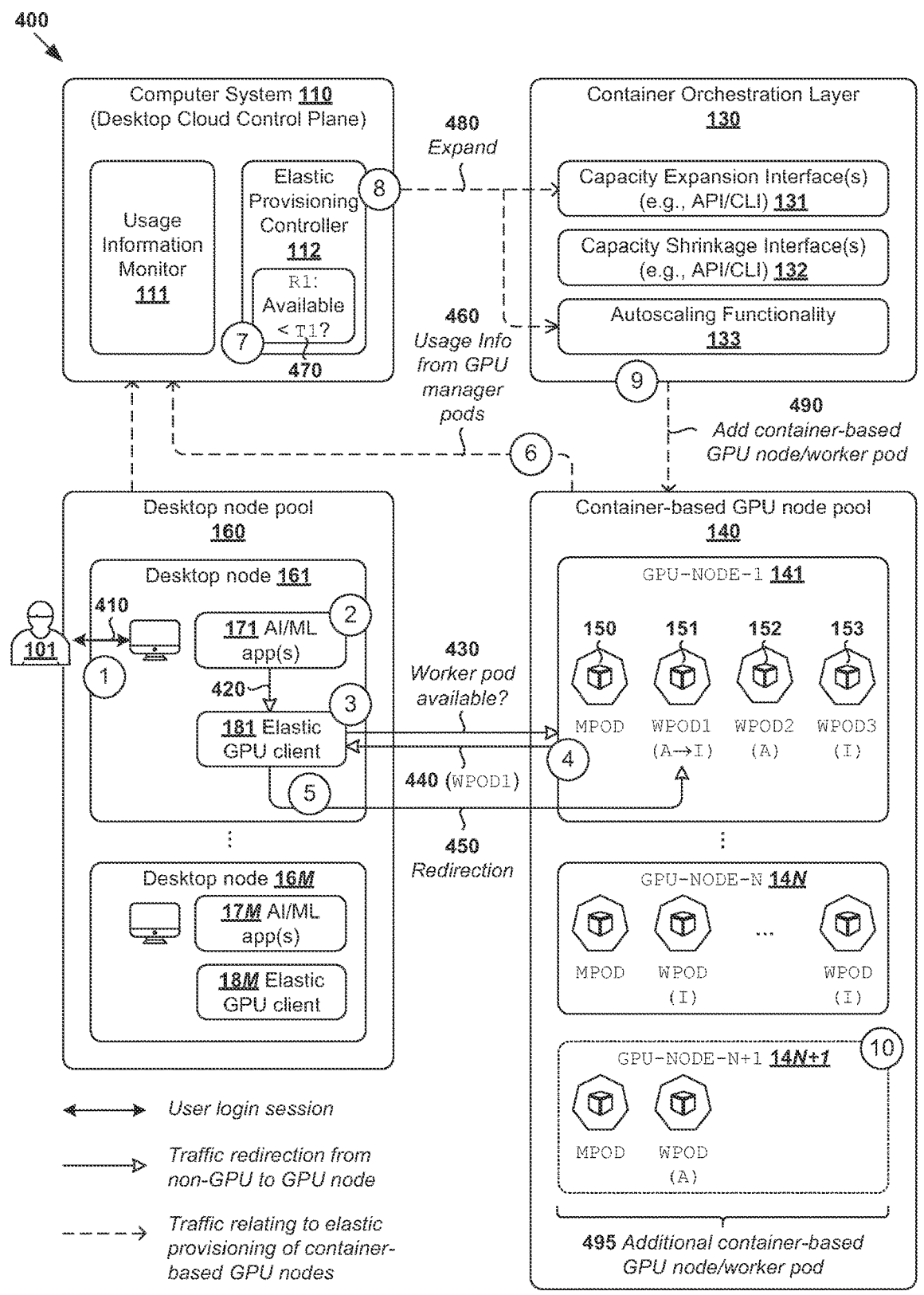
FIG. 4 is a schematic diagram illustrating a first example of elastic provisioning of container-based GPU nodes with capacity expansion.

At 410 in FIG. 4, user 101 may log in to assigned desktop node 161 (i.e., non-GPU node) and launch a workload to launch AI/ML workload 171. For example in FIG. 4, AI/ML workload 171 may be a TensorFlow® application that involves computationally and data intensive tasks. In general, TensorFlow (available from Google LLC) provides a software library or framework for implementing ML and deep learning concepts, etc. Desktop node 161 may be a non-GPU VM that is capable of implementing a parallel computing platform that allows software to use GPU resource(s) for general purpose processing. See corresponding 310-315 in FIG. 3.

One example parallel computing platform is CUDA that is developed by Nvidia® Corporation. CUDA allows software developers and software engineers to use a CUDA-enabled GPU for general purpose processing, i.e., general purpose computing on GPU (GPGPU). The CUDA platform may be implemented as a software layer that provides access to a GPU's virtual instruction set and parallel computational elements to execute compute kernels. The platform may include software library or libraries relevant to AI/ML. The library may include a collection of non-volatile resources used by GPU-related programs, including configuration information, documentation, help information, classes, values, specifications, program codes, subroutines, any combination thereof, etc.

(b) Request for GPU Acceleration Using GPU Worker Pod

At 420-430 in FIG. 4, in response to intercepting a request for GPU acceleration from AI/ML workload 171, elastic GPU client 181 may generate and send a request to GPU manager pod 150 to determine which GPU worker pod is available. In practice, the interception at block 320 may involve elastic GPU client 181 inspecting data and/or data pointers of CUDA call(s) initiated by AI/ML workload 171 to determine whether GPU acceleration is required. See corresponding 320-325 in FIG. 3.

At 440 in FIG. 4, based on state information associated with GPU worker pod(s) within GPU node 141, GPU manager pod 150 may determine whether a GPU worker pod is available to provide GPU acceleration for AI/ML workload 171. In the example in FIG. 4, container-based GPU node 141 may include one GPU manager pod 150 and three GPU worker pods 151-153. First GPU worker pod 151 ("WPOD1") and second GPU worker pod 152 ("WPOD2") may be associated with state=available (denoted as "A" in FIG. 4), and third GPU worker pod 153 ("WPOD3") with state=in-use (denoted as "I" in FIG. 4).

For example, GPU manager pod 150 may determine that a particular GPU worker pod is "available" based on determination that the GPU worker pod (a) does not have a user logged in, or (b) is not processing any workload that requires access to GPU for acceleration. In response to determination that first GPU worker pod 151 is available for GPU acceleration, GPU manager pod 150 may generate and send a response identifying first GPU worker pod 151 to elastic GPU client 181. Otherwise, the response may indicate that no GPU worker pod is available. See also 330 in FIG. 3.

In practice, GPU manager pod 150 may be configured to monitor any suitable state information associated with GPU worker pods 151-153 relating to total allocation, total GPU(s), core utilization, memory utilization or any combination thereof. GPU manager pod 150 may be configured to act as a broker for GPU resources in GPU node pool 140. GPU manager pod 150 may provide any suitable API(s) for elastic GPU client 181 to access GPU worker pod(s) under its management. As will be discussed below, GPU manager pod 150 may also report usage information associated with GPU node 141 to control plane entity 110.

(c) Traffic Redirection from Non-GPU to GPU Node

At 450 in FIG. 4, in response to receiving a response from GPU manager pod 150, elastic GPU client 181 may determine that GPU worker pod 151 is available, and perform traffic redirection from non-GPU desktop node 161 to GPU worker pod 151. The traffic redirection may include elastic GPU client 181 redirecting data and/or data pointer(s) intercepted from AI/ML workload 171 towards GPU worker pod 151. Elastic GPU client 181 may communicate with GPU worker pod 151 in a peer-to-peer manner. See corresponding 335 in FIG. 3.

In practice, GPU worker pod 151 may represent a basic GPU computing unit for AI/ML workload 171, which is configured to consume GPU resources provided by GPU node pool 140. GPU worker pod 151 may be a Kubernetes pod that is capable of leveraging a horizonal pod autoscaling functionality (e.g., HorizontalPodAutoscaler) to automatically update a workload resource (e.g., Deployment or StatefulSet) with the aim of automatically scaling the workload to match demand. Note that the above traffic redirection example may be repeated for other AI/ML workloads 172-17M running on respective non-GPU desktop nodes 162-16M to access GPU acceleration provided by container-based GPU node pool 140.

Example Capacity Expansion (a) Usage Information

At 460 in FIG. 4, while GPU worker pod 151 provides GPU acceleration for remote AI/ML workload 171, control plane entity 110 (e.g., usage information monitor 111) may obtain and monitor usage information associated with both GPU node pool 140 and desktop node pool 160. For example in FIG. 4, GPU manager pod 150 of GPU node 141 may collect the usage information associated with three GPU worker pods 151-153. In this case, the usage information reported to control plane entity 110 may indicate that first and second GPU worker pods 151-152 are available, and third GPU worker pod is in use (i.e., not available). See corresponding 340 in FIG. 3.

Here, the term "obtain" may refer generally to control plane entity 110 retrieving or receiving the usage information from the GPU manager pods, or any suitable datastore accessible by control plane entity 110. For example, using a periodic polling approach, control plane entity 110 may implement a daemon process to pull the usage information from multiple (N) GPU manager pods in respective GPU nodes 141-14N. One example may involve control plane entity 110 invoking API(s) supported by GPU manager pods, such as "GET-clusters-self-allocation," etc. Alternatively or additionally, GPU manager pods may send (i.e., push) the usage information towards control plane entity 110 periodically or whenever the usage information is updated.

(d) Elastic Provisioning Rule(s)

At 470 in FIG. 4, based on the usage information, control plane entity 110 (e.g., elastic provisioning controller 112) may apply elastic provisioning rule(s) to determine whether capacity adjustment (e.g., expansion or shrinkage) is required. Depending on the desired implementation, a first rule (denoted as R1) may be configured to maintain a minimum number of available GPU worker pods using a first threshold, such as T1=2. In the example in FIG. 4, once GPU worker pod 151 has been assigned to AI/ML workload 171, the number of available GPU worker pods decreases from two to one. Since the number of available GPU worker pods <T1=2 according to the first rule, control plane entity 110 may determine that capacity expansion is required. See corresponding 345-346 in FIG. 3.

At 480 in FIG. 4, in response to determination that capacity expansion is required, control plane entity 110 (e.g., elastic provisioning controller 112) may configure container-based GPU node pool 140 to expand the capacity by adding a new GPU node and/or a new GPU worker pod. See 350 (expand) and 355 in FIG. 3. Capacity expansion may be performed in several ways.

In a first example, capacity expansion may involve control plane entity 110 interacting with container orchestration layer 130 via first interface 131, such as invoking API call(s), generating and sending CLI command(s), etc. One example command to new GPU node(s) may be "add nodes -f list.yaml." Here, "list.yaml" is a configuration file in YAML Ain't Markup Language (YAML) format that specifies the new GPU node(s) to be added. In a second example, capacity expansion may involve control plane entity 110 leveraging autoscaling functionality 133 provided by container orchestration layer 130, such as a Kubernetes functionality called horizontal pod autoscaling, etc. Here, horizontal scaling may refer to deploying more pod(s) in response to increased load. This is different from vertical scaling, which involves assigning more resources (e.g., memory or CPU) to existing pods.

In practice, horizontal pod autoscaling may be implemented to scale out (increase) or scale in (decrease) the number worker pods in GPU node pool 140 to meet demand. The scaling in or out may be performed at run time based on predefined metrics, such as utilization rate, etc. In Kubernetes, a "HorizontalPodAutoscaler" may be implemented to automatically update a workload resource (e.g., Deployment, StatefulSet or similar that supports autoscaling) to scale the workload to match demand. The HorizontalPodAutoscaler may be implemented as a Kubernetes API resource and a controller. The resource may determine the behavior of the controller that runs within the Kubernetes control plane. The horizontal pod autoscaling controller may periodically adjust the desired scale of GPU node pool 140 to match any desired metric(s). In this case, if the demand for GPU acceleration increases, and the number of free GPU worker pods is below a configured threshold (e.g., T1=2), the HorizontalPodAutoscaler may instruct a workload resource (e.g., Deployment, StatefulSet, or similar) to scale up by adding a GPU node and/or a GPU worker pod.

At 490-495 in FIG. 4, based on configuration by control plane entity 110, container orchestration layer 130 may expand the capacity of container-based GPU node pool 140, such as by adding a new GPU node and/or a new GPU worker pod. For example in FIG. 4, container-based GPU node pool 140 that includes N GPU nodes 141-14N may be expanded to include additional GPU node 14N+1 (shown in dotted line). Alternatively or additionally, a new GPU worker pod (not shown for simplicity) may be added to any one of existing GPU nodes 141-14N.

Example Capacity Shrinkage

Figure 5:
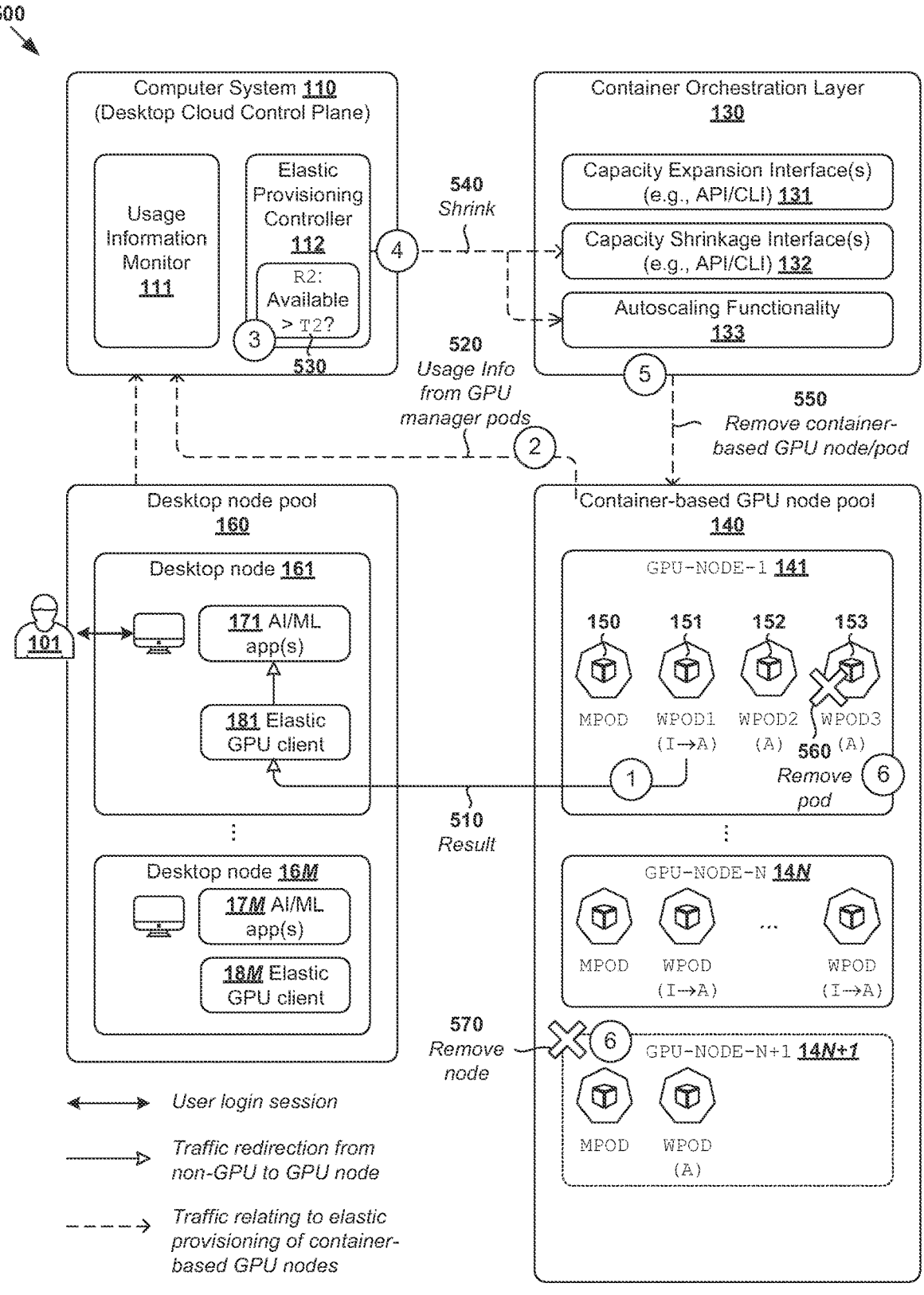
FIG. 5 is a schematic diagram illustrating a second example of elastic provisioning of container-based GPU nodes with capacity shrinkage.

FIG. 5 is a schematic diagram illustrating second example 500 of elastic provisioning of container-based GPU nodes with capacity shrinkage. At 510 in FIG. 5, sometime later GPU worker pod 151 may complete the GPU acceleration request from AI/ML workload 171 and report any suitable result(s) to elastic GPU client 181. Further, GPU worker pod 151 may notify GPU manager pod 150 that it is "free and ready for a new workload request." See also 365-370 in FIG. 3.

At 520 in FIG. 5, GPU manager pod 150 on GPU node 141 may report updated usage information to control plane entity 110. The updated usage information may indicate that GPU worker pods 151-153 are now available. Other GPU manager pods in different GPU nodes (e.g., 142 to 14N+1) may also send their updated usage information to control plane entity 110. Similar to 460 in FIG. 4, the updated usage information may be obtained according to a pull or push mechanism (e.g., periodic polling by control plane entity 110 and/or push notifications by GPU manager pods). See also 375 in FIG. 3, which continues to 340.

At 530 in FIG. 5, based on the updated usage information, control plane entity 110 (e.g., elastic provisioning controller 112) may apply elastic provisioning rule(s) to determine whether capacity adjustment is required. In addition to R1, a second rule (denoted as R2) may be configured to maintain a maximum number of available GPU worker pods using a second threshold, such as T2=5. This way, control plane entity 110 may maintain the number of available GPU worker pods to be within a range bounded by a minimum threshold (e.g., T1=2) and a maximum threshold (e.g., T2=5) according to R1 and R2. See 345 and 347 in FIG. 3.

In the example in FIG. 5, once GPU worker pod 151 is available again, the number of available GPU worker pods increases by one. Additional GPU worker pods in other GPU nodes may also become available. In this case, in response to determination that the number of available GPU worker pods exceeds T2=5, control plane entity 110 may determine that capacity shrinkage is required. In practice, any alternative and/or additional elastic provisioning rules may be configured and applied. For example, T1 may be configured to be the same as T2, in which case a specific number (e.g., T1=T2=2) of available/spare GPU worker pods are maintained.

At 540 in FIG. 5, in response to determination that capacity shrinkage is required, control plane entity 110 (e.g., elastic provisioning controller 112) may configure container-based GPU node pool 140 to shrink or reduce the capacity of container-based GPU node pool 140. See 350 (shrink) and 355 in FIG. 3. Capacity shrinkage may be performed in several ways.

In a first example, control plane entity 110 may interact with container orchestration layer 130 via second interface 132 to initiate capacity shrinkage, such as invoking API call(s), generating and sending CLI command(s), etc. An example command may be "delete node <nodeName>-f list.yaml." Here, <nodeName>=name of the GPU node to be deleted. Configuration file="list.yaml" in YAML format specifies all GPU nodes 141-14N+1 in GPU node pool 140. In a second example, control plane entity 110 may leverage autoscaling functionality 133 provided by container orchestration layer 130 to reduce the capacity of container-based GPU node pool 140, such as a Kubernetes functionality called horizontal pod autoscaling (i.e., HorizontalPodAutoscaler discussed above), etc. In this case, if the demand for GPU acceleration reduces, and the number of free GPU worker pods is above a configured threshold (e.g., T2=5), the HorizontalPodAutoscaler may instruct a workload resource (e.g., Deployment, StatefulSet, or similar) to scale down by removing a GPU node and/or a GPU worker pod.

At 550 in FIG. 5, based on the configuration by control plane entity 110, container orchestration layer 130 may shrink the capacity of container-based GPU node pool 140, such as by removing a GPU node and/or GPU worker pod. For example in FIG. 5, capacity shrinkage may involve removing GPU worker pod 153 from container-based GPU node pool 140. Alternatively or additionally, an existing GPU worker node (along with its GPU manager and worker nodes) may be removed.

Computer System(s)

Depending on the desired implementation, a Kubernetes cluster may include any suitable pod(s). A pod is generally the smallest execution unit in Kubernetes and may be used to encapsulate one or more containerized applications. Some example pods are shown in FIG. 6, which is a schematic diagram illustrating an example physical implementation view of container pods in SDN environment 600. Here, SDN environment 600 may include any number of hosts, such as hosts 610A-B (also known as "computer systems," "computing devices", "host computers). Depending on the desired implementation, SDN environment 600 may include additional and/or alternative components than that shown in FIG. 6.

Host 610A/610B may include suitable hardware 612A/612B and virtualization software (e.g., hypervisor-A 614A, hypervisor-B 614B) to support various VMs. For example, host-A 610A may support VM1 631 on which POD1 641 is running, as well as support VM2 632 on which POD2 642 is running. Host-B 610B may support, while VM3 633 on which POD3 643 and POD4 644 are running. Hardware 612A/612B includes suitable physical components, such as central processing unit(s) (CPU(s)) or processor(s) 620A/620B; memory 622A/622B; physical network interface controllers (PNICs) 624A/624B; and storage disk(s) 626A/626B, etc.

Hypervisor 614A/614B maintains a mapping between underlying hardware 612A/612B and virtual resources allocated to respective VMs. Virtual resources are allocated to respective VMs 631-633 to support a guest operating system (OS; not shown for simplicity) and application(s); see 651-653. For example, the virtual resources may include virtual CPU, guest physical memory, virtual disk, virtual network interface controller (VNIC), etc. Hardware resources may be emulated using virtual machine monitors (VMMs). For example in FIG. 6, VNICs 661-664 are virtual network adapters, respectively, and are emulated by corresponding VMMs (not shown) instantiated by their respective hypervisor at respective host-A 610A and host-B 610B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 614A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-6" may refer generally to a link layer or media access control (MAC) layer; "layer-3" a network or Internet Protocol (IP) layer; and "layer-4" a transport layer (e.g., using TCP, User Datagram Protocol (UDP), etc.), in the Open System Interconnection (OSI) model, although the concepts described herein may be used with other networking models.

SDN controller 670 and SDN manager 672 are example network management entities in SDN environment 600. One example of an SDN controller is the NSX controller component of VMware NSX® (available from VMware, Inc.) that operates on a central control plane. SDN controller 670 may be a member of a controller cluster (not shown for simplicity) that is configurable using SDN manager 672. Network management entity 670/672 may be implemented using physical machine(s), VM(s), or both. To send or receive control information, a local control plane (LCP) agent (not shown) on host 610A/610B may interact with SDN controller 670 via control-plane channel 601/602.

Through virtualization of networking services in SDN environment 600, logical networks (also referred to as overlay networks or logical overlay networks) may be provisioned, changed, stored, deleted and restored programmatically without having to reconfigure the underlying physical hardware architecture. Hypervisor 614A/614B implements virtual switch 615A/615B and logical distributed router (DR) instance 617A/617B to handle egress packets from, and ingress packets to, VMs 631-633. In SDN environment 600, logical switches and logical DRs may be implemented in a distributed manner and can span multiple hosts.

For example, a logical switch (LS) may be deployed to provide logical layer-6 connectivity (i.e., an overlay network) to VMs 631-633. A logical switch may be implemented collectively by virtual switches 615A-B and represented internally using forwarding tables 616A-B at respective virtual switches 615A-B. Forwarding tables 616A-B may each include entries that collectively implement the respective logical switches. Further, logical DRs that provide logical layer-3 connectivity may be implemented collectively by DR instances 617A-B and represented internally using routing tables (not shown) at respective DR instances 617A-B. Each routing table may include entries that collectively implement the respective logical DRs.

Packets may be received from, or sent to, each VM via an associated logical port (see 665-668). Here, the term "logical port" or "logical switch port" may refer generally to a port on a logical switch to which a virtualized computing instance is connected. A "logical switch" may refer generally to a software-defined networking (SDN) construct that is collectively implemented by virtual switches 615A-B, whereas a "virtual switch" may refer generally to a software switch or software implementation of a physical switch. In practice, there is usually a one-to-one mapping between a logical port on a logical switch and a virtual port on virtual switch 615A/615B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

A logical overlay network may be formed using any suitable tunneling protocol, such as Virtual eXtensible Local Area Network (VXLAN), Stateless Transport Tunneling (STT), Generic Network Virtualization Encapsulation (GENEVE), Generic Routing Encapsulation (GRE), etc. For example, VXLAN is a layer-6 overlay scheme on a layer-3 network that uses tunnel encapsulation to extend layer-6 segments across multiple hosts which may reside on different layer 6 physical networks. Hypervisor 614A/614B may implement virtual tunnel endpoint (VTEP) 619A/619B to encapsulate and decapsulate packets with an outer header (also known as a tunnel header) identifying the relevant logical overlay network (e.g., VNI). Hosts 610A-B may maintain data-plane connectivity with each other via physical network 605 to facilitate east-west communication among VMs 631-633.

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described or can be alternatively located in one or more devices different from that in the examples. The units in the examples described can be combined into one module or further divided into a plurality of sub-units.

The invention claimed is:

1. A method for a computer system to perform elastic scaling of a graphics processing unit (GPU) node pool that comprises a plurality of container-based GPU nodes hosting container pods that are capable of accessing GPUs, wherein the method comprises:

obtaining usage information of the GPU node pool, the usage information indicating a number of the container pods that are each available to use the GPUs to execute computational tasks initiated outside the GPU node pool, the container pods that are available each being determined based on either a user not being logged in to the container pod or the container pod not currently processing computational tasks using the GPUs for acceleration;

based on the usage information, applying one or more rules to determine whether the number of available container pods satisfies a minimum or maximum number of available container pods;

in response to determination at a first time that the number of available container pods does not satisfy the minimum number of available container pods, adding (a) at least one container-based GPU node, or (b) at least one container pod to one of the container-based GPU nodes; and in response to determination at a second time that the number of available container pods does not satisfy the maximum number of available container pods, removing (a) at least one of the multiple-container-based GPU nodes, or (b) at least one container pod from one of the container-based GPU nodes.

2. The method of claim 1, wherein the usage information is obtained from a plurality of GPU manager pods executing respectively in the container-based GPU nodes, the GPU manager pods each managing one or more GPU worker pods executing in the same one of the container-based GPU nodes as the GPU manager pod, and the usage information being based on availability of GPU worker pods.

3. The method of claim 1, wherein adding the at least one container-based GPU node or at least one container pod includes requesting a container orchestration layer to add the at least one container-based GPU node or at least one container pod, the container orchestration layer being configured to create and manage the container pods hosted by the container-based GPU nodes, and wherein removing the at least one of the container-based GPU nodes or at least one container pod includes requesting the container orchestration layer to remove the at least one of the container-based GPU nodes or at least one container pod.

4. The method of claim 1, wherein adding the at least one container-based GPU node or at least one container pod is triggered automatically by a container orchestration layer that is configured to create and manage the container pods hosted by the container-based GPU nodes, and removing the at least one of the container-based GPU nodes or at least one container pod is triggered automatically by the container orchestration layer.

5. The method of claim 1, wherein the usage information is obtained by a control plane entity of the computer system, and the GPU node pool is deployed across multiple cloud providers.

6. One or more non-transitory computer-readable storage media including instructions which, in response to execution by one or more processors of a computer system, cause the one or more processors to perform a method for elastic scaling of a graphics processing unit (GPU) node pool that comprises a plurality of container-based GPU nodes hosting container pods that are capable of accessing GPUs, wherein the method comprises:

obtaining usage information of the GPU node pool, the usage information indicating a number of the container pods that are each available to use the GPUs to execute computational tasks initiated outside the GPU node pool, the container pods that are available each being determined based on either a user not being logged in to the container pod or the container pod not currently processing computational tasks using the GPUs for acceleration;

based on the usage information, applying one or more rules to determine whether the number of available container pods satisfies a minimum or maximum number of available container pods;

in response to determination at a first time that the number of available container pods does not satisfy the minimum number of available container pods, adding (a) at least one container-based GPU node, or (b) at least one container pod to one of the container-based GPU nodes; and in response to determination at a second time that the number of available container pods does not satisfy the maximum number of available container pods, removing (a) at least one of the container-based GPU nodes, or (b) at least one container pod from one of the container-based GPU nodes.

7. The one or more non-transitory computer-readable storage media of claim 6, wherein the usage information is obtained from a plurality of GPU manager pods executing respectively in the container-based GPU nodes, the GPU manager pods each managing of one or more GPU worker pods executing in the same one of the container-based GPU nodes as the GPU manager pod, and the usage information being based on availability of GPU worker pods.

8. The one or more non-transitory computer-readable storage media of claim 6, wherein adding the at least one container-based GPU node or at least one container pod includes requesting a container orchestration layer to add the at least one container-based GPU node or at least one container pod, the container orchestration layer being configured to create and manage the container pods hosted by the container-based GPU nodes, and wherein removing the at least one of the container-based GPU nodes or at least one container pod includes requesting the container orchestration layer to remove the at least one of the container-based GPU nodes or at least one container pod.

9. The one or more non-transitory computer-readable storage media of claim 6, wherein adding the at least one container-based GPU node or at least one container pod is triggered automatically by a container orchestration layer that is configured to create and manage the container pods hosted by the container-based GPU nodes, and removing the at least one of the container-based GPU nodes or at least one container pod is triggered automatically by the container orchestration layer.

10. The one or more non-transitory computer-readable storage media of claim 6, wherein the usage information is obtained by a control plane entity of the computer system, and the GPU node pool is deployed across multiple cloud providers.

11. A computer system, comprising:

one or more processors; and one or more non-transitory computer-readable media having stored thereon instructions that, when executed by the one or more processors, cause the one or more processors to perform a method for elastic scaling of a graphics processing unit (GPU) node pool that comprises a plurality of container-based GPU nodes hosting container pods that are capable of accessing GPUs, wherein the method comprises:

obtaining usage information of the GPU node pool, the usage information indicating a number of the container pods that are each available to use the GPUs to execute computational tasks initiated outside the GPU node pool, the container pods that are available each being determined based on either a user not being logged in to the container pod or the container pod not currently processing computational tasks using the GPUs for acceleration;

based on the usage information, applying one or more rules to determine whether the number of available container pods satisfies a minimum or maximum number of available container pods;

in response to determination at a first time that the number of available container pods does not satisfy the minimum number of available container pods, adding (a) at least one container-based GPU node, or (b) at least one container pod to one of the container-based GPU nodes; and in response to determination at a second time that the number of available container pods does not satisfy the maximum number of available container pods, removing (a) at least one of the container-based GPU nodes, or (b) at least one container pod from one of the container-based GPU nodes.

12. The computer system of claim 11, wherein the usage information is obtained from a plurality of GPU manager pods executing respectively in the container-based GPU nodes, the GPU manager pods each managing one or more GPU worker pods executing in the same one of the container-based GPU nodes as the GPU manager pod, and the usage information being based on availability of GPU worker pods.

13. The computer system of claim 11, wherein adding the at least one container-based GPU node or at least one container pod includes requesting a container orchestration layer to add the at least one container-based GPU node or at least one container pod, the container orchestration layer being configured to create and manage the container pods hosted by the container-based GPU nodes, and wherein removing the at least one of the container-based GPU nodes or at least one container pod includes requesting the container orchestration layer to remove the at least one of the container-based GPU nodes or at least one container pod.

14. The computer system of claim 11, wherein adding the at least one container-based GPU node or at least one container pod is triggered automatically by a container orchestration layer that is configured to create and manage the container pods hosted by the container-based GPU nodes, and removing the at least one of the container-based GPU nodes or at least one container pod is triggered automatically by the container orchestration layer.

15. The computer system of claim 11, wherein the usage information is obtained by a control plane entity of the computer system, and the GPU node pool is deployed across multiple cloud providers.

* * * * *